(12) United States Patent
Henry et al.

(10) Patent No.: US 8,462,748 B2
(45) Date of Patent: *Jun. 11, 2013

(54) LAYER-2 IP NETWORKING METHOD AND APPARATUS FOR MOBILE HOSTS

(75) Inventors: Paul Shala Henry, Holmdel, NJ (US); Zhimei Jiang, Eatontown, NJ (US); Byoung-Jo J Kim, Jersey City, NJ (US); Kin K Leung, Edison, NJ (US); Hui Luo, Marlboro, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 314 days.

This patent is subject to a terminal disclaimer.

(21) Appl. No.: 12/829,360

(22) Filed: Jul. 1, 2010

(65) Prior Publication Data
US 2010/0265892 A1 Oct. 21, 2010

Related U.S. Application Data

(63) Continuation of application No. 11/403,767, filed on Apr. 13, 2006, now Pat. No. 7,768,980, which is a continuation of application No. 09/942,421, filed on Aug. 30, 2001, now Pat. No. 7,058,059.

(60) Provisional application No. 60/269,919, filed on Feb. 20, 2001.

(51) Int. Cl.
*H04W 4/00* (2009.01)
*H04L 12/28* (2006.01)
*G06F 15/173* (2006.01)

(52) U.S. Cl.
USPC ........ 370/338; 370/352; 370/395.1; 370/409; 709/242

(58) Field of Classification Search
USPC .................. 709/242; 370/208–474, 395.1
See application file for complete search history.

(56) References Cited

U.S. PATENT DOCUMENTS

| | | | |
|---|---|---|---|
| 5,572,528 A | 11/1996 | Shuen | |
| 6,434,134 B1 | 8/2002 | La Porta et al. | |
| 6,603,758 B1 | 8/2003 | Schmuelling et al. | |
| 6,704,789 B1 * | 3/2004 | Ala-Laurila et al. | 709/230 |
| 6,792,474 B1 | 9/2004 | Hopprich et al. | |
| 7,058,059 B1 * | 6/2006 | Henry et al. | 370/395.1 |
| 7,768,980 B1 * | 8/2010 | Henry et al. | 370/338 |
| 2002/0133573 A1 | 9/2002 | Matsuda et al. | |
| 2003/0039237 A1 * | 2/2003 | Forslow | 370/352 |

\* cited by examiner

*Primary Examiner* — Afsar M Qureshi

(57) ABSTRACT

A method and apparatus to enable IP networking for mobile hosts without requiring changes to be made to the TCP/IP stack in the operating system installed on the mobile hosts. The apparatus is an "intelligent device" that can be installed on or connected to a mobile host, and may comprise a software-only logical module, physical hardware, or a combination of both. To a mobile host, the intelligent device emulates a network interface such as an Ethernet card or a telephone modem. The intelligent device appears to an access network just like any regular IP host connected to the access network through a physical network interface device. The intelligent device handles all mobile networking functions for the mobile host, and may control multiple different physical network interface devices to enable a connection to the "best" access network available to the mobile user at his location.

20 Claims, 9 Drawing Sheets

LAYER-2 IP NETWORKING METHOD AND APPARATUS FOR MOBILE HOSTS

This application is a continuation of U.S. patent application Ser. No. 11/403,767, filed Apr. 13, 2006, now U.S. Pat. No. 7,768,980 which is currently allowed and is a continuation of U.S. patent application Ser. No. 09/942,421, filed Aug. 30, 2001, (now U.S. Pat. No. 7,058,059), which claims the benefit of Provisional Application Ser. No. 60/269,919, filed Feb. 20, 2001; where all of the above cited applications are herein incorporated by reference.

FIELD OF THE INVENTION

The present invention relates generally to mobile networking, and more particularly, to a method and apparatus to support IP networking functions for mobile hosts that access multiple networks.

BACKGROUND

Computer networks are typically comprised of a plurality of networks and may be defined at many levels of grouping and communication. A primary network, such as a LAN, may be characterized as a geographically localized network consisting of hardware and software. LANs link personal computers, workstations, printers, file servers and other peripherals over generally short distances. A secondary network may be thought of as two primary networks connected by a router. A tertiary network is defined as a network including at least first and second primary networks separated from each other by a third primary network (i.e., an intervening network). The third network is connected to the first network by one router and to the second primary network by another router.

In low level networking, several devices exchange data over a communication link such as hard wire, fiber-optic cable, radio frequency (RF) or the like, via network cards. A network card facilitates a data connection between the communication link and a device connected to the network (i.e., a personal computer, information appliance, personal data assistant, data-enabled wireless handset, or any other type of device capable of accessing information through a data network). The device (host) can be characterized as a node on the network. A server is a computer connected to a network through a network card and programmed to function as a traffic manager and storage apparatus for data communicated over the network from the nodes on the network. A network can have anywhere from a single to a plurality of servers, depending upon the configuration.

In a wireless communication system such as, for example, a WLAN, there is no hard wire connection between a node and a primary network. Each node (or mobile host) contains a network card for transmitting and receiving data over a wireless link. An access point bridges the gap between a hard wire associated with a primary network and the node connected by a wireless communication link with the primary network. The access point can be described as a transmitter and receiver for communicating between the network and the mobile node.

The layer or level concept for networked computing was developed by the International Organization for Standardization Open Systems Interconnection Model (ISO/OSI). The ISO/OSI model is a layered architecture that standardizes levels of service and types of interaction for computers exchanging data through a communications network. The ISO/OSI model encompasses seven layers or levels, each of which builds upon the standards contained in the layer(s) below it. From the lowest to the highest, layer 1 pertains to hardware or physical level links, layer 2, data link, layer 3, network, layer 4 transport, layer 5, session, layer 6, presentation and layer 7, application. The well-known TCP/IP protocol stack comprises the transport layer, network layer and some upper interfaces to the data link layer.

The transport layer receives data from the application layer and facilitates the flow of data between the application layers on the end systems. In the TCP/IP stack, two different transport protocols are utilized: the transmission control protocol (TCP) and the user Datagram protocol (UDP). TCP is a connection-oriented protocol that reliably transfers data between the source and destination. The TCP layer on the source establishes a connection with the TCP layer on the destination, and then the TCP layers transfer all packets over this connection. TCP guarantees that the data will be send correctly from the source to the destination. The TCP at the source divides the data received from the application layer into packets for the network layer, acknowledges all packets received, sets time-outs to ensure that lost data is retransmitted, and implements other functionality to make sure that the corresponding TCP layer at the destination receives data correctly from the application layer.

UDP is a connection-less protocol that provides unreliable data transfer. Upon receiving data from the application layer, UDP forms a packet known as a Datagram and sends the packet to the network layer for transfer to the destination without acknowledgments and no guarantee that the Datagrams will reach the destination.

The TCP/IP protocol stack is utilized to transfer data within a single network or within an internetwork (i.e., Internet) that is a collection of networks using the same protocol stack. An addressable application program that can be accessed through the TCP/IP protocol stack has an associated IP address specifying a host ID (identifying the computer on which the resource is located) and a network ID (identifying the network on which the computer is located). See, e.g., "INTERNET PROTOCOL," IETF Network Working Group, RFC 791 (September 1981); S. Deering, R. Hinden, "Internet Protocol, Version 6 (IPv6) Specification," IETF Network Working Group, RFC 1883 (December 1995), which are incorporated by reference herein.

IP is a Datagram-oriented protocol that encapsulates data into an IP packet for transmission, and attaches addressing information to the header of the packet. IP headers contain 32-bit addresses that identify the sending and receiving hosts. These addresses are utilized by intermediate routers to select a path through the network for the packet to travel to the ultimate destination at the intended address. In this connection, the initial prefixes of an IP address can be used for generalized routing decisions. IP addresses contain implied geographical information about the location of a particular host on the Internet. Thus, the IP protocol allows Datagrams from any Internet node to be routed to any other Internet node if the sender knows the IP address of the receiver.

With the large growth in mobile computing and network access, mobile IP has been growing in popularity. The IP addressing scheme used for regular Internet routing, however, is not compatible with mobile IP because the IP addressing scheme contains implicit geographic information. If a user desires to employ a fixed IP address to identity a mobile host, the IP packets destined for that mobile host will not be routed to the mobile host when it is away from its "home" network, the network that relates to its fixed IP address, unless the IP packets are forwarded to the mobile host in a special way that is not supported by the regular Internet routing scheme.

In order to address this concern, RFC 2002, entitled "IP Mobility Support," 1996, specifies an enhanced protocol that enables the transparent routing of IP Datagrams to mobile hosts on the Internet. In accordance with RFC 2002, each mobile host can always be identified by its home IP address, irrespective of the current attachment point to the Internet. When disposed away from the home network, the mobile host can have an associated "care-of" address, which provides information that enables routing of Datagrams to the mobile host. RFC 2002 facilitates this by registering the care-of address with a "home agent." The home agent forwards IP packets destined for the mobile host using a technique referred to as "IP tunneling." The home agent attaches a new IP header containing the care of address to any IP packet having a destination address corresponding to the mobile host's home IP address. A "foreign agent" at the care of address strips off the IP tunneling header and sends the Datagram to the mobile host at the current point of attachment to the Internet via a special link layer routing method, or the mobile host serves as a "foreign agent" for itself and strips off the IP tunneling header before passing the data to the upper layer.

Mobile IP requires the IP stack on the mobile host to be modified. Because most operating systems, like Windows, are designed for "static" computers, there is no need to have this functionality built in, especially since Mobile IP based networks are not very popular. Moreover, the operating systems that support Mobile IP require specialized knowledge and must be specially configured by a mobile user. It is, therefore, advantageous to provide a method and intelligent interface for a mobile host that supports IP networking functions to enable the mobile host to connect to a plurality of networks, without having to change the mobile host's operating system.

SUMMARY OF THE INVENTION

In accordance with the invention, it is an object thereof to provide an apparatus and method to support IP networking over mobile hosts.

It is another object of the invention to provide an intelligent physical or logical device (an "intelligent device") that emulates a popular standard network interface (such as an Ethernet network interface for Windows). The intelligent device interfaces with the mobile host to permit access to multiple networks.

It is still another object of the invention to enable a mobile user to get the optimal IP connectivity available in the current environment where the mobile host resides, by monitoring different network interfaces and automatically switching to the "best" interface without disconnecting a session.

It is another object of the invention to provide all mobile networking issues, including mobility management, access diversity, and security, at or below layer 2 (from the mobile host's point of view) such that the operating system on a mobile host does not require modifications.

It is yet another object of the invention to enable vendors of mobile hosts to simplify their products by adopting the relatively simple operating systems designed for "static" computers and supporting a single popular standard network interface. Similarly, vendors of the interface equipment may reduce development complexity as there is no dependence on the operating system used by the mobile hosts.

In accordance with the foregoing objects and additional objects that will become apparent hereinafter, the present invention provides a method and apparatus for supporting IP networking for mobile hosts. The apparatus is an "intelligent device" that can be installed on or connected to a mobile host. The intelligent device may comprise a software-only logical module, physical hardware, or a combination of both. To a mobile host, the intelligent device emulates a network interface such as an Ethernet card or a telephone modem. The intelligent device appears to an access network just like any regular IP host connected to the access network through a physical network interface device. Accordingly, the intelligent device, instead of the operating system on the mobile host as required by Mobile IP and IPsec, handles all mobile networking functions for the mobile. The intelligent device may control multiple different physical network interface devices to enable a connection to the "best" access network available to the mobile user at his location. Furthermore, the intelligent device can be pre-configured or remotely configured by a service provider, thereby obviating any need for a mobile user to have specialized networking knowledge in order to make the network connections.

The intelligent device can support several IP networking functions for the mobile host with which it is associated. For example, the mobile host can be connected to the Internet or its home network via any access network so long as the access network has an agreement with the mobile host's Internet service provider (ISP) or home network owner to provide IP connectivity to the mobile user. In this regard, the access network will assign a local IP address (called access IP address) to the mobile host, which can be used to route IP packets for the mobile host over the Internet through the access network as long as the mobile host has a connection to the access network. The access network may only allow the mobile host use this access IP address to send/receive packets to/from a gateway in its ISP network (i.e., a portion of the Internet) or home network (e.g., an intranet behind firewall).

From the mobile host's point of view, the mobile host is always "directly" and "statically" connected to its ISP or home network and always has IP connectivity. That is, the mobile host will always use an IP address that is obtained from its ISP or its home network (the home IP address). Accordingly, the mobile host (specifically, the IP stack of the operating system of the mobile host) doesn't know and doesn't need to know if the mobile user is roaming. Home IP connectivity seamlessly and transparently maintained while the mobile user roams, including moving from one access network to another. To support this feature, the intelligent device maintains an IP tunnel to a Mobile IP Home Agent (HA) or some gateway capable of mobility management in the mobile host's ISP or home network, whenever the mobile host is not directly connected to its ISP or home network.

The intelligent device monitors all physical network interfaces for available access networks to the mobile user in his current location, and automatically switches to the "best" access network based on channel quality, charging scheme, data rate, moving speed, access coverage, and user preference, etc. The switching operation is unknown to the mobile host and does not break the mobile host's IP connectivity. To perform a switch, the intelligent device needs to obtain a new access IP address from the new access network; to establish a new IP tunnel to its home agent using the new access IP address; to release the old access IP address; and to remove the old IP tunnel associated with the old access IP address.

The IP packets can be secured while they are routed in the access network. If the mobile host is connected to its home network via an access network and an HA that doesn't belong to its home network, the IP packets can be secured while they are routed in the access network and by the HA.

In a preferred embodiment of the invention, the intelligent device is referred to as a combination (combo) network interface card. The intelligent device emulates a standard network interface device on a mobile host and controls multiple network interface devices for access to different networks. The intelligent device comprises a dedicated processing unit (CPU) and memory, thereby enabling it to function as an independent microcomputer. Alternatively, the functionality can be embodied in an intermediate network device driver (such as an NDIS-compliant driver in Windows system), that controls a plurality of different network interface devices installed on the mobile host. In this instance, the logical device obtains the CPU cycles of the mobile host whenever a layer-3 packet is written to the device driver by the mobile host or a layer-2 frame is admitted by one of network interface devices. Utilizing a timer callback function, the logical device periodically "steals" the mobile host's CPU cycles for monitoring all network interfaces.

The intelligent device emulates an Ethernet card installed on the mobile host. To access, for example, a Cellular Digit Packet Data (CDPD) network and wireless LAN (WLAN), the intelligent device has two network interfaces, a CDPD modem and a WLAN card. Further, the intelligent device has two Ethernet MAC addresses. The first MAC address is "owned" by the emulated Ethernet card and is therefore known to the mobile host to which the intelligent device is connected. The intelligent device uses the second MAC address to emulate the MAC address of the first-hop router to the mobile host. In the exemplary embodiment, WLAN is considered to be the "best" access network. That is, if the mobile host is under coverage of a WLAN, the intelligent device will always use the WLAN as the access network. The mobility management protocol is based on Mobile IP. That is, when the mobile host is connected to its ISP network or home network via an access network, the intelligent device acts as a Mobile IP Foreign Agent (FA). When the mobile host is directly connected to its home network, the intelligent device acts as a layer-2 transceiver. The IP layer security protocol is based on IPsec. That is, IP packets transmitted in the IP tunnel between the intelligent device and the HA may be encrypted. If the mobile host connects to its home network but the HA doesn't belong to its home network, two levels of IP tunnels may exist. The outside IP tunnel is between the intelligent device and the HA. The inner IP tunnel is between the intelligent device and an RA (Remote Access) gateway in the home network. The mobile host may not necessarily have fixed IP address. It can apply IP addresses from an access network, ISP network, and home network respectively using PTPP or DHCP.

The mobile networking functions performed by the intelligent device can be categorized into configuration functions, connection functions, disconnections, routing functions, and handoff functions.

The configuration parameters are saved in network profiles on the intelligent device. A mobile user may have multiple network profiles. Each network profile contains all information for the mobile host to be connected to a target network. This includes the Network Access Identifier, which can be used to identify the mobile user and its home AAA server (NAI) and authentication credentials. The network profile further includes the IP address of HA, the IP address of RA gateway in the target network (if it exists); and methodology for obtaining the home IP address from the target network, the access IP address from each access network, and for creating an create IP tunnel.

The mobile user can add, change, or remove configuration parameters using a tool running on the mobile host. After being authenticated by the intelligent device, a system administrator of an access network, the ISP network, or the home network, can also remotely add, change, or remove the portion of configuration parameters that regard his network.

During the booting process, the intelligent device may display a list of choices, each corresponding to a network profile, and give the mobile user a chance to choose to which network the mobile host will be connected. Although the mobile user may have multiple choices, the mobile host can only interface with one network after the booting process finishes. For example, if the mobile user chooses to connect to the ISP network, the mobile host will "feel" that it is directly and permanently connected on the ISP network after it is booted, and it will possess a permanent IP address in this network until it is shutdown or reset.

Several illustrative embodiments are disclosed herein. In a first example, the mobile host is "statically" connected to the CDPD network. In a second example, the mobile host is "statically" connected to its ISP network, through the CDPD network or a WLAN. In a third example, the mobile host is "statically" connected to its home network, through the CDPD network or a WLAN and a HA in its ISP network. In all cases, the mobile host will use DHCP to apply for an IP address, however, it is to be understood that other protocols may be utilized including PPP, PPPoE, etc.

The present invention will now be described in detail with particular reference to the accompanying drawings.

DETAILED DESCRIPTION OF THE PREFERRED EMBODIMENT

Referring now to the several views of the drawings, there are depicted several exemplary embodiments of the present invention.

Figure 1:
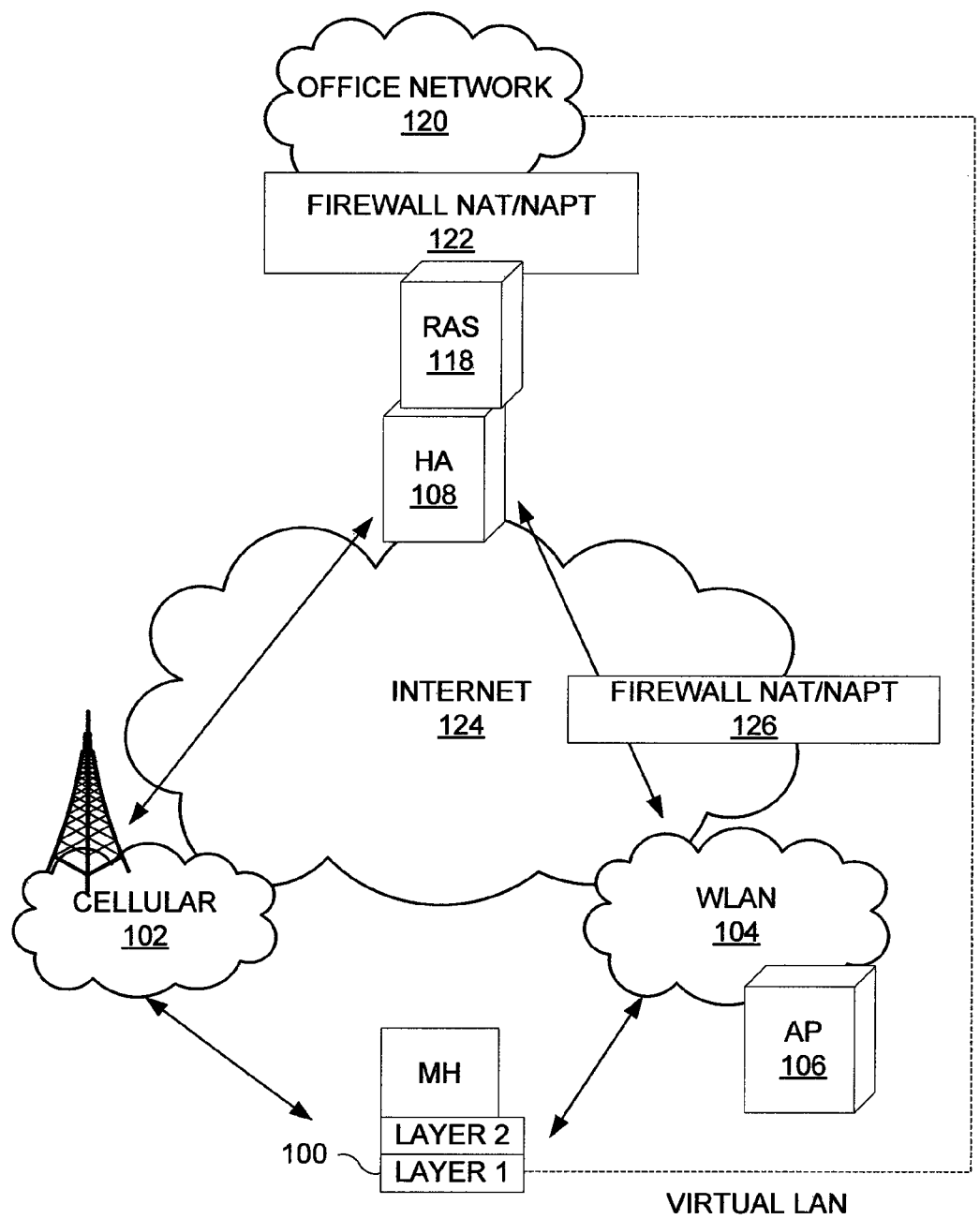
FIG. 1 is an illustration of a mobile host roaming between first and second access networks, where the mobile host is connecting to the office network and the connection goes through a mobility gateway, which is a combination of a HA and RAS.

Referring now to FIG. 1, a mobile host (MH) 100 roams between a cellular network 102, such as a Cellular Digit Packet Data (CDPD), and a Wireless Local Area Network (WLAN) 104. When disposed within the coverage of the WLAN 104, the MH 100 connects to the WLAN 104 via an access point (AP) 106. The WLAN is connected to the Internet 124. The WLAN 104 communicates with the HA 108 via a firewall (which could be a packet filter plus NAT/NAPT) 126. The HA 108 also communicates with the CDPD network 102. In this embodiment, the HA 108 is bundled together with a remote access server or gateway (RAS) 118 on a corporate LAN 120 through a firewall 122.

Figure 2:
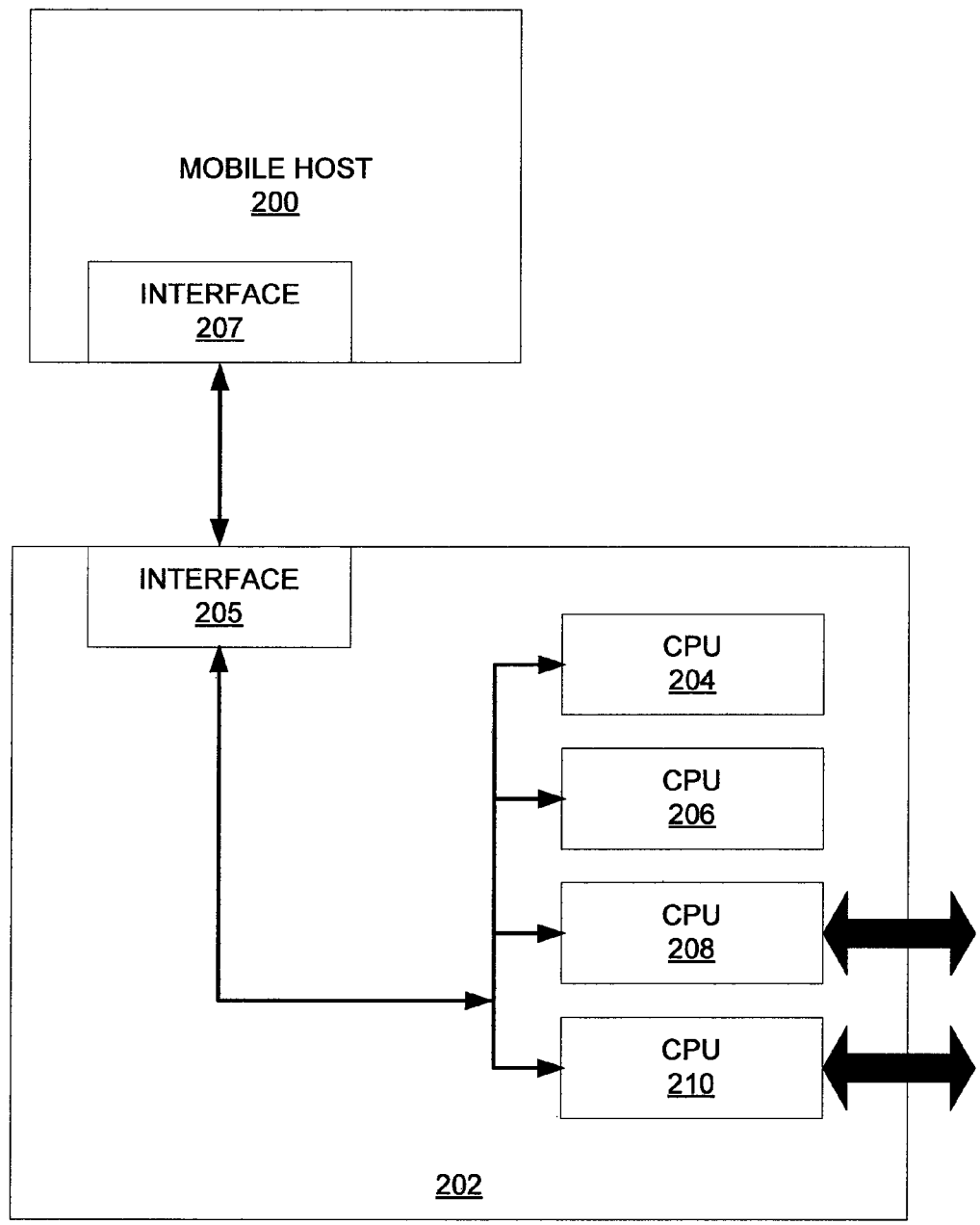
FIG. 2 is a schematic of a network access device (mobile host) and an intelligent device or combo card connected thereto.

Referring now to FIG. 2, a mobile host 200 is a network access device such as a personal computer, information appliance, personal data assistant, data-enabled wireless handset, or any other type of device capable of accessing information through a packet-switched data network. Each MH 200 has an intelligent device that is identified generally by the reference numeral 202. The intelligent device 202 emulates a standard network interface device on a mobile host 200 and controls multiple network interfaces to enable MH 200 to access different networks. The intelligent device 200 includes a dedicated central processing unit (CPU) 204 and memory 206, thereby operating as an independent microcomputer. In lieu of a pure hardware implementation, the intelligent interface can be a logical module that appears as an intermediate network device driver (such as an NDIS-complaint driver in Windows system), to control a plurality of different network interface devices installed on the mobile host. In this instance, the logical module obtains the mobile host's CPU cycles whenever a layer-3 packet is written to the device driver by the mobile host or a layer-2 frame is admitted by one of network interface devices. Utilizing a timer callback function, the logical module periodically "steals" the mobile host's CPU cycles for monitoring all network interfaces.

In the illustrative embodiment, the intelligent device emulates an Ethernet card installed on the MH 200. To access, for example, a CDPD network and WLAN, the intelligent device 202 has two network interface devices, a CDPD modem 208 and a WLAN card 210. The components of the intelligent device 202 are connected via a bus in accordance with conventional practice. The intelligent device 202 has an appropriate interface 205, like a PCMCIA card, for connecting to the MH 200 via a corresponding interface 207. The intelligent device 202 has two Ethernet MAC addresses—MAC 1 and MAC 2. MAC 1 is "owned" by the "emulated Ethernet card" 202 and is therefore known to the MH 200. The intelligent device 202 utilizes MAC 2 to emulate the MAC address of the first-hop router to the MH 200. In the exemplary embodiment, WLAN is considered to be the "best" access network. That is, if the mobile host is under coverage of a WLAN, the intelligent device 202 will always use the WLAN as the access network.

In the first group of examples, the Dynamic Host Configuration Protocol (DHCP) is utilized to configure the network address. See R. Droms, "Dynamic Host Configuration Protocol," IETF Network Working Group, RFC 2131 (March 1997); S. Alexander, R. Droms, "DHCP Options and BOOTP Vendor Extensions," IETF Network Working Group, RFC 2132 (March 1997); which are incorporated by reference herein.

Figure 3:
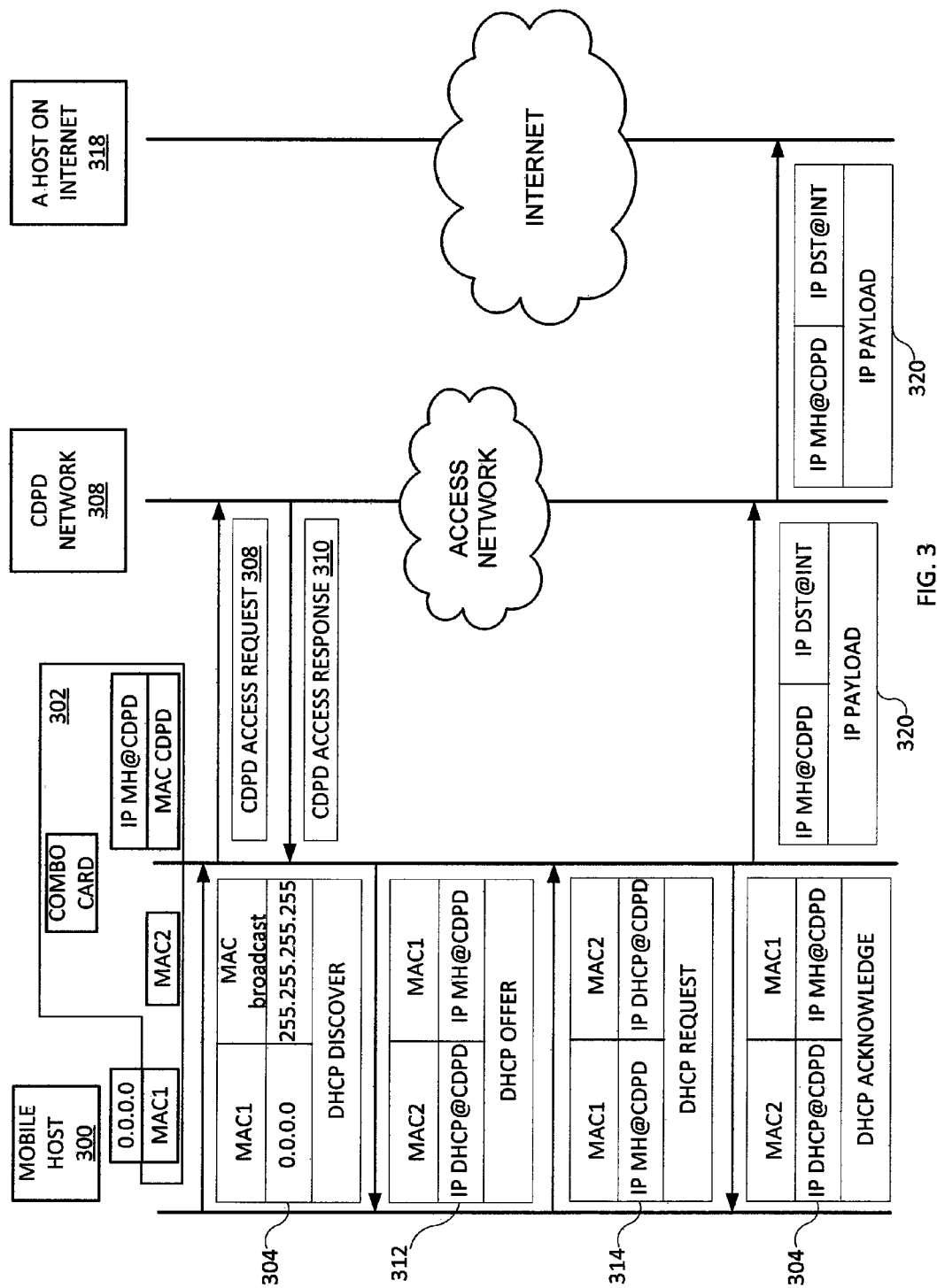
FIG. 3 is a flow diagram of the connection signaling between the mobile host, intelligent device, an access network, and a destination host on the Internet, assuming that the mobile host uses DHCP to connect to the Internet but where the connection is actually established via a CDPD network.

Referring now to FIG. 3, the MH 300 does not differentiate between the CDPD and WLAN interfaces. Instead, it "sees" an "emulated" Ethernet interface at the intelligent device 302. At 304, the MH 300 sends a DHCP DISCOVER message to the intelligent device 302 in an IP packet with 0.0.0.0 as the source IP address and 255.255.255.255 as the destination IP address. The IP packet is packaged into an Ethernet frame with MAC 1 as the source MAC address and an Ethernet broadcast address ($MAC_{broadcast}$) as the destination broadcast message. After receiving the DHCP_DISCOVER message, the intelligent device 302 connects to the CDPD network 306 by following a standard CDPD connection process, which is conceptually illustrated by a CDPD Access Request at 308 and a CDPD Access Response at 310 (the CDPD connection procedure details are more complicated and thus being omitted). As part of the CDPD service agreement, an IP address $IP_{MH@CDPD}$ is allocated by the CDPD network 306 to the MH 300 in advance. After the intelligent device 302 is connected to the CDPD network, it generates a DHCP_OFFER message with $IP_{MH@CDPD}$ and other configuration parameters for the MH 300. The intelligent device 302 selects an IP address $IP_{DHCP@CDPD}$ which belongs to the same subnet as $IP_{MH@CDPD}$. $IP_{DHCP@CDPD}$ is used as the source IP address in a "faked" DHCP_OFFER message to the MH 300. The intelligent device 302 then packages the DHCP_OFFER message into an Ethernet frame with MAC 2 as the source MAC address and MAC 1 as the destination MAC address, and sends the frame to the MH 300 at 312. The emulated Ethernet device will cause a hardware interruption to notify the operating system of the MH 300. The MH 300 accepts the "faked" DHCP_OFFER message from the intelligent device 302, and then sends a DHCP_REQUEST message back to the intelligent device 302 at 314. This message uses $IP_{MH@CDPD}$ as the source IP address and the "faked" $IP_{DHCP@CDPD}$ as the destination IP address. At 316, the intelligent device 302 responds with a DHCP_ACKNOWLEDGE message with MAC 2 as the source MAC address, MAC 1 as the destination MAC address and $IP_{DHCP@CDPD}$ as the source IP address and $IP_{MH@CDPD}$ as the destination IP address. The MH 300 is now "statically" connected to the CDPD network and will permanently use $IP_{MH@CDPD}$ as its IP address for data communications until shutdown. When the MH 300 sends a Datagram to a target host 318 on the Internet, the intelligent device 302 sends a packet 320 to the access network (CDPD) with $IP_{MH@CDPD}$ as the source IP address and $IP_{DST@INT}$ as the destination IP address of the target host 318. This Datagram is then routed to host 318 in a conventional manner.

Figure 4:
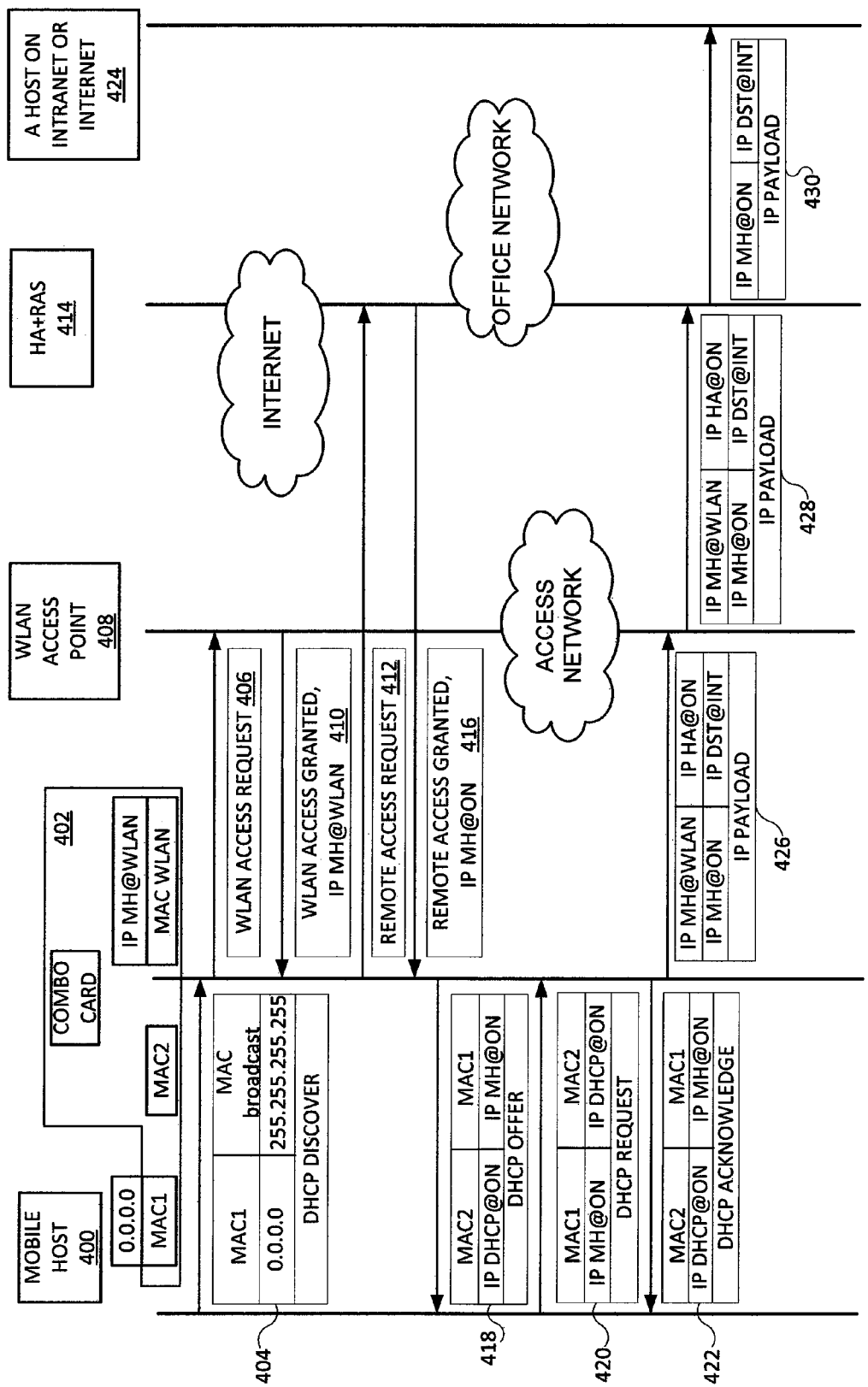
FIG. 4 is a flow diagram of the connection signaling between the mobile host, intelligent device, a home agent, and a destination host on the Internet or the mobile host's office network, assuming that the mobile host uses DHCP to connect to the office network but where the connection is actually established via a WLAN and the HA/RAS gateway.

Referring now to FIG. 4, the MH 400 is assumed to be within the coverage of a WLAN. Using the same methodology described above with respect to the CDPD network, the MH 400 sends a DHCP_DISCOVER message to the intelligent device 402 in an IP packet with 0.0.0.0 as the source IP address and 255.255.255.255 as the destination IP address at 404. The IP packet is packaged into an Ethernet frame with MAC 1 as the source MAC address and an Ethernet broadcast address ($MAC_{broadcast}$) as the destination MAC address. After receiving the DHCP_DISCOVER message, the intelligent device 402 checks if the MH 400 is under the coverage of a WLAN. Assuming this is the case, at 406 the intelligent device 402 utilizes its WLAN interface to submit authentication credentials and to request an access IP address from the WLAN in the form of a WLAN Access Request. The message is received at the WLAN access point (AP) 408. The WLAN authenticates the mobile user and an IP address $IP_{MH@WLAN}$ is assigned to the MH 400 using the DHCP procedure (not shown). At 410, this information is sent to the intelligent device 402. The intelligent device 402 then sends a Remote Access Request at 412 with $IP_{MH@WLAN}$ to the Home Agent (HA) and Remote Access Server or Gateway (RAS) (collectively HA+RAS) 414 on the Office Network. The intelligent device 402 may have to resubmit authentication credentials to the HA+RAS again. The authentication process is omitted here for brevity. Once the mobile user is authenticated, at 416 a Remote Access Granted message containing an IP address on the Office Network $IP_{MH@ON}$ is communicated to the intelligent device 402. In this manner, a secure IP tunnel is established between the intelligent device 402 and the HA-ERAS 414 ($IP_{HA@ON}$).

The intelligent device 402 then constructs a DHCP_OFFER message with $IP_{MH@ON}$ and other configuration parameters. The intelligent device 402 selects an IP address $IP_{DHCP@ON}$ which belongs to the same subnet as $IP_{MH@ON}$. This address is used as the source IP address in a "faked" DHCP_OFFER message which is packaged into an Ethernet frame with MAC 2 as the source MAC address and MAC 1 as the destination MAC address, and $IP_{DHCP@ON}$ for the source IP address and $IP_{MH@ON}$ for the destination IP address. AT 418 this Ethernet frame is sent to the MH 400 via the emulated Ethernet interface causes a hardware interrupt to notify the operating system of the MH 400. The MH 400 accepts the DHCP_OFFER message from the intelligent device 402 and at 420 then sends a DHCP_REQUEST message back to the intelligent device 402. The message is packaged into an Ethernet frame with MAC 1 as the source MAC address, MAC 2 as the destination MAC address, $IP_{MH@ON}$ as the source IP address and the faked $IP_{DHCP@ON}$ as the destination IP address. At 422, the intelligent device 402 sends a DHCP_ACKNOWLEDGE message in the same format to the MH 400. The MH 400 is now "statically" connected to the office network and will use $IP_{MH@WLAN}$ as its new IP address until shutdown or reset. Any IP packets that are sent or received by the MH 400 are encapsulated in IP packets with $IP_{MH@WLAN}$ as the source address and $IP_{HA@ON}$ as the destination address. For example, in the case of sending a Datagram to a host 424 on the Internet or an Intranet, at 426 the intelligent device 402 sends an IP-in-IP packet to the WLAN AP 408 of the form [$IP_{MH@WLAN}$, $IP_{HA@ON}$ [$IP_{MH@on}$, $IP_{DST@INT}$, IP PAYLOAD]]. This IP packet is forwarded to the HA+RAS 414 at 428, where $IP_{MH@WLAN}$ and $IP_{HA@ON}$ are stripped off and the packet then sent to the host 424 at 430.

Figure 5:
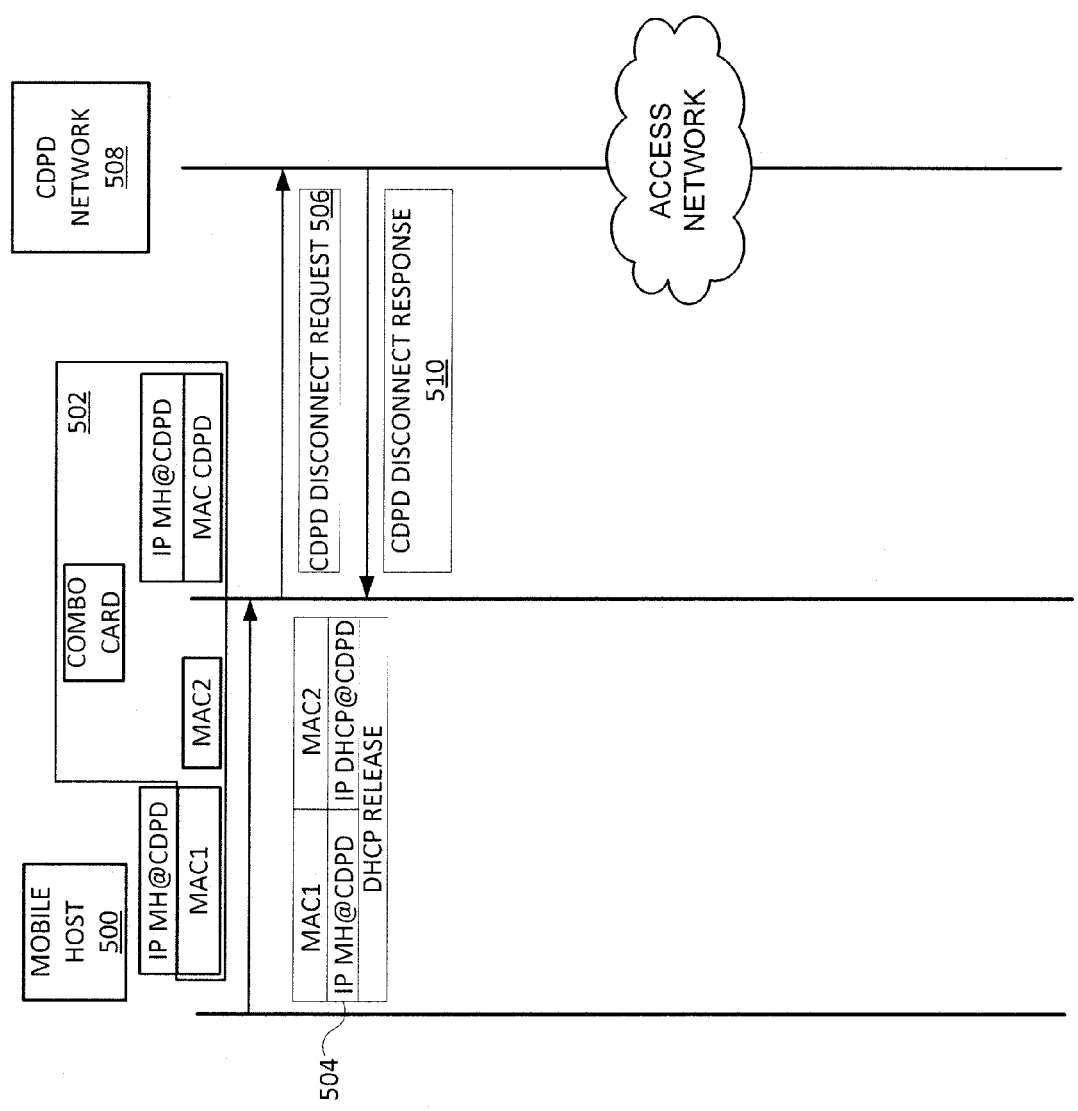
FIG. 5 is a flow diagram of disconnect signaling of the system depicted in FIG. 3.

Referring now to FIG. 5, there is depicted a flow diagram illustrating a disconnection sequence corresponding to the DHCP protocol shown in FIG. 3. Specifically, before the MH 500 shuts down, it sends a DHCP_RELEASE message to the DHCP server using $IP_{DHCP@CDPD}$. Again, this is the "faked" IP address generated by the intelligent device 502. The message is encapsulated in an Ethernet frame with MAC 1 as the source MAC address and MAC 2 as the destination MAC address. $IP_{MH@CDPD}$ is the source IP address and $IP_{DHCP@CDPD}$ is the destination IP address. The message is sent at 504 from the MH 500 to the intelligent device 502. The intelligent device 502 then disconnects from the CDPD network by following a standard CDPD disconnection procedure, which is illustrated by a CDPD Disconnect Request message 506 to the CDPD network 508 and a CDPD Disconnect Acknowledge message 510. The intelligent device 502 need not wait for response from the CDPD network 508 prior to powering down the CDPD interface.

Figure 6:
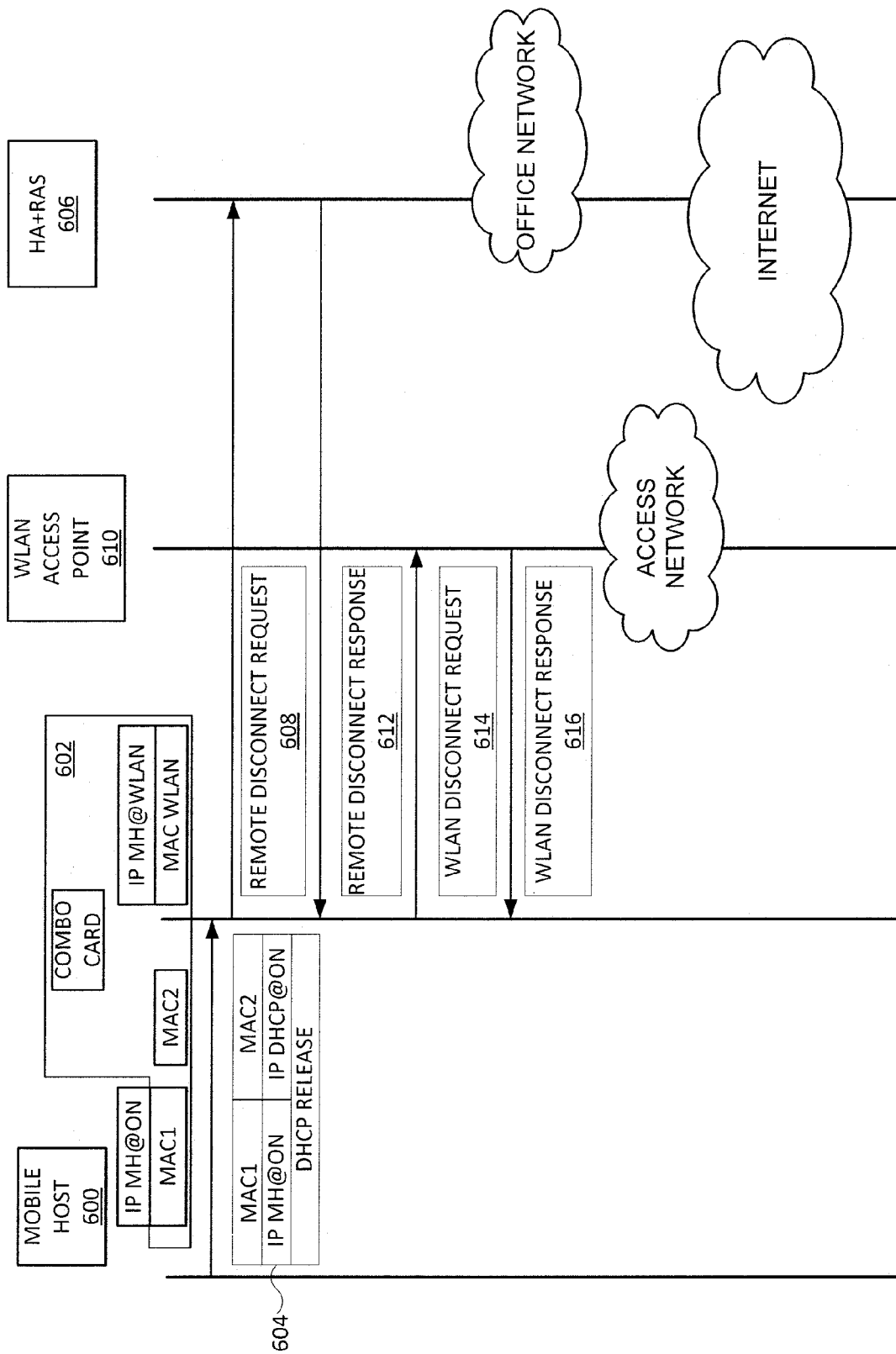
FIG. 6 is a flow diagram of disconnect signaling of the system depicted in FIG. 4.

Referring to FIG. 6, there is shown a flow diagram of a disconnection sequence for the DHCP embodiment illustrated in FIG. 4. The MH 600 sends a DHCP_RELEASE message to the DHCP server using $IP_{DHCP@ON}$. Here again, this is the "faked" IP address generated by the intelligent device 602. The message is encapsulated in an Ethernet frame with MAC 1 as the source MAC address and MAC 2 as the destination MAC address. $IP_{MH@ON}$ is the source IP address and $IP_{DHCP@ON}$ is the destination IP address. The message is sent at 604 from the MH 600 to the intelligent device 602. After receiving the DHCP_RELEASE message from the MH 600, the intelligent device 602 disconnects from the HA+RAS 606 on the Office Network via a Remote Disconnect Request 608. The message is relayed over the AP 610. At 612, the HA+RAS 606 sends a Remote Disconnect Response 612 to the intelligent device 602. The intelligent device 602 need not wait for the Remote Disconnect Response 612 prior to initiating the release of the $IP_{MH@WLAN}$ by sending a WLAN Disconnect Request at 614. The WLAN 610 then sends a WLAN Disconnect Response at 616. As described above with respect to the CDPD interface, the intelligent device 602 need not wait for a response from the WLAN network prior to powering down the WLAN interface.

Figure 7:
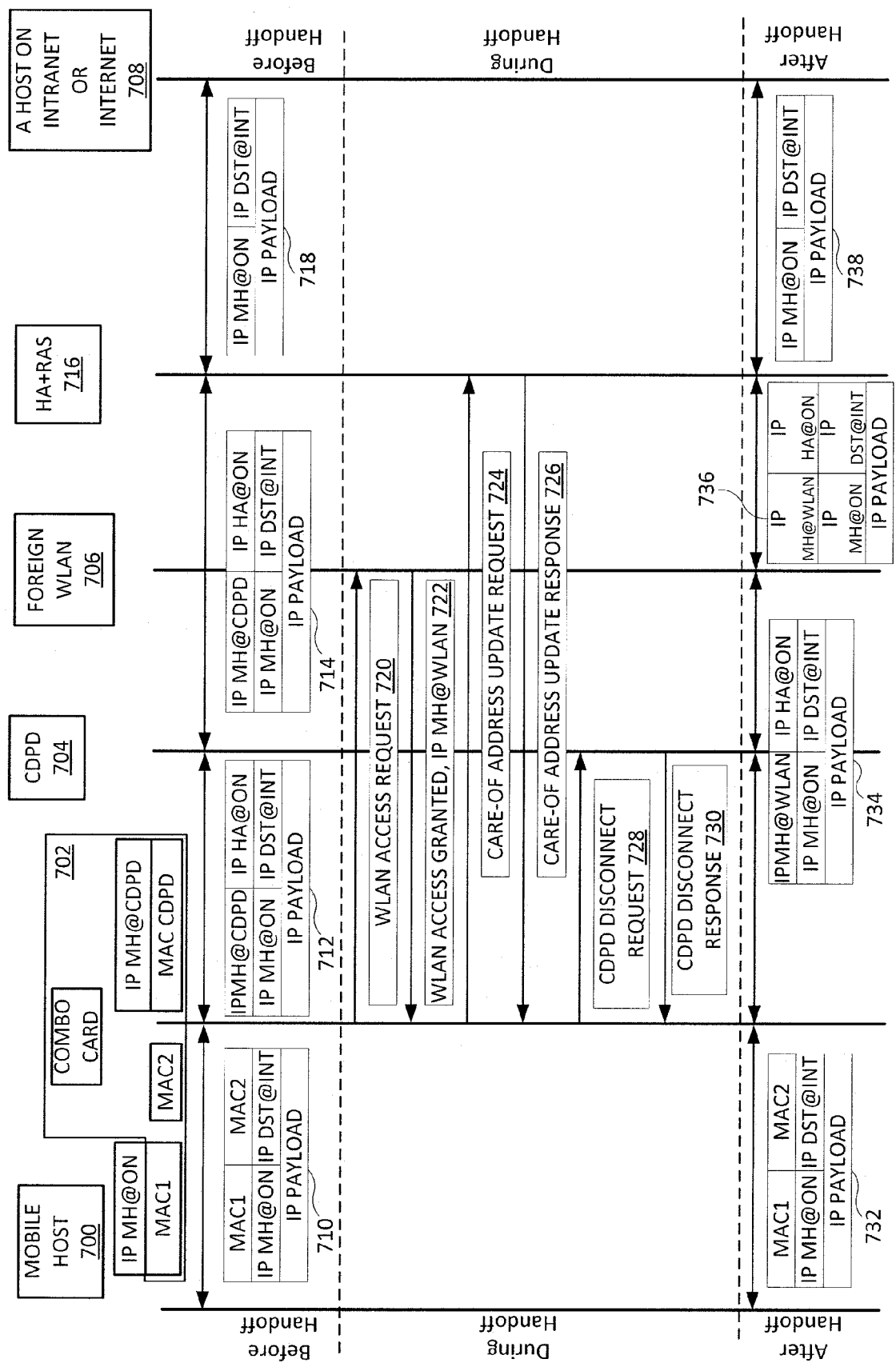
FIG. 7 is a flow diagram of handoff signaling when the mobile host is moving from a CDPD to a foreign WLAN.

Referring now to FIG. 7, there is depicted a flow diagram of handoff signaling as a MH 700 roams between a CDPD network 704 and a foreign WLAN 706. While the MH 700 roams within the coverage of the CDPD network 704, IP packets are transported to the ultimate destination, i.e., a host on the Intranet or Internet 708 using the tunneling technique described above. Specifically, at 710 and IP payload encapsulated in an Ethernet frame using MAC 1 as the source MAC address and MAC 2 as the destination MAC address with $IP_{MH@ON}$ as the source IP address and $IP_{DST@INT}$ as the destination IP address, is sent from the MH 700 to the intelligent device 702. At 712 the intelligent device 702 sends an IP-in-IP packet to the CDPD network 704 of the form [$IP_{MH@CDPD}$, $IP_{HA@ON}$, [$IP_{MH@ON}$, $IP_{DST@INT}$, IP Payload]]. This packet is forwarded at 714 to the HA+RAS 716, which unwraps the packet by stripping off $IP_{MH@CDPD}$ and $IP_{HA@ON}$. At 718 the HA+RAS 716 sends the original packet with IP source address $IP_{MH@ON}$ and destination address $IP_{DST@INT}$ to the host 708. When the MH 700 roams into coverage of the foreign WLAN 706, the handoff is initiated when the intelligent device 702 sends a WLAN Access Request 720 to the WLAN 706 as shown in FIG. 4 and described above. The WLAN 706 authenticates the mobile user and at 722 responds to the intelligent device 702 with a WLAN Access Granted 722 containing $IP_{MH@WLAN}$. The intelligent device then sends a Care-of Address Update Request 724 to the HA+RAS 716 to update the mobility association from <$IP_{MH@CDPD}$, $IP_{HA@ON}$> to <$IP_{MH@WLAN}$, $IP_{HA@ON}$>. At 726, a Care-of Address Update Response is sent back to the intelligent device 702 acknowledging the update. The intelligent device 702 next sends a CDPD Disconnect Request 728 to the CDPD network 704. A CDPD Disconnect Response 730 is then sent from the CDPD network 704 to the intelligent device 702 thereby disconnecting the MH 700 from the CDPD network 704. After the handoff, the IP packets are tunneled between the MH 700 via the intelligent device 702 and the host 708 using the IP address $IP_{MH@WLAN}$. The MH 700 sends an IP packet 732 to the intelligent device 702 having the same format as 710 described above. At 734, the intelligent device 702 then sends an IP-in-IP packet of the form [$IP_{MH@WLAN}$, $IP_{HA@ON}$, [$IP_{MH@ON}$, $IP_{DST@INT}$, IP PAYLOAD]] to the WLAN 706. The IP packet is forwarded from the AP to the HA+RAS 716 at 736. The HA+RAS 716 then unwraps the packet by stripping off $IP_{MH@WLAN}$ and $IP_{HA@ON}$ and at 738 sends the original IP packet to the host 708.

Figure 8:
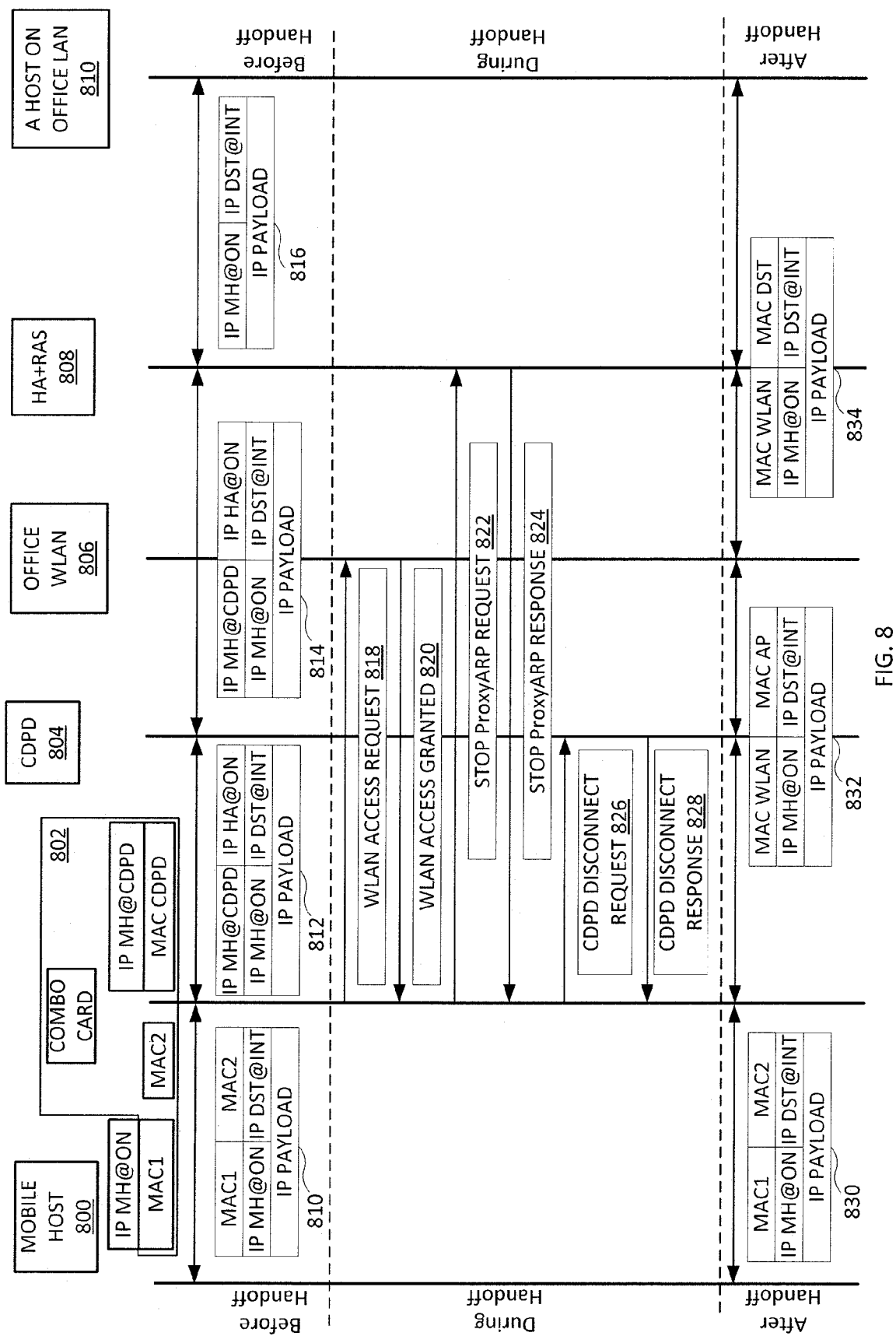
FIG. 8 is a flow diagram of handoff signaling when the mobile host is moving from a CDPD to an office WLAN.

Referring now to FIG. 8, there is depicted a flow diagram of handoff signaling as a MH 800 roams between a CDPD network 804 and an office LAN 806, assuming the mobile host is already "statically" connected to the office network. Prior to handoff, IP packets are tunneled between the intelligent device 802 and the HA+RAS 808 using the IP addresses $IP_{MH@CDPD}$ and $IP_{HA@ON}$. At 810 the MH 800 sends the intelligent device 802 an IP payload encapsulated in an Ethernet frame using MAC 1 as the source MAC address and MAC 2 as the destination MAC address with $IP_{MH@ON}$ as the source IP address and $IP_{DST@INT}$ as the destination IP address. The intelligent device 802 then sends an IP-in-IP packet having the form [$IP_{MH@CDPD}$, $IP_{HA@ON}$, [$IP_{MH@ON}$, $IP_{DST@INT}$, IP Payload]] to the CDPD network 804. At 814, the CDPD network 804 sends the IP-in-IP packet to the HA+RAS 808. The HA+RAS 808 unwraps the IP-in-IP packet into the original IP packet from the MH 800 and forwards the packet at 816 to the host 809. In the meantime, the HA maintains the mobility association <$IP_{MH@ON}$, $IP_{MH@CDPD}$> for the MH 800 in memory and runs a proxy ARP to claim ownership of $IP_{MH@ON}$ in the office network. To effect a handoff from the CDPD network 804 to the office WLAN 806, the intelligent device 802 sends a WLAN Access Request at 818 to the office WLAN. The WLAN authenticates the user (not shown) and, if access is granted, then sends a WLAN Access Granted message 820 back to the intelligent device 802. The intelligent device 802 then sends a Stop ProxyARP Request 822 to the HA+RAS 808 such that the mobility association <$IP_{MH@ON}$, $IP_{MH@CDPD}$> is removed from the routing database of the HA+RAS 808. The HA+RAS 808 responds to the intelligent device 802 with a Stop ProxyARP Response 824. The intelligent device 802 then initiates the disconnect sequence of the MH 800 from the CDPD network 804 by sending a CDPD Disconnect Request 826. A CDPD Disconnect Response 828 is then sent from the CDPD network 804 to the intelligent device 802. After the handoff, IP packets are communicated from the MH 800 to the host 809 through the WLAN using any regular methodology. Here, an IP payload from the MH 800 is encapsulated in an Ethernet frame 830 with MAC 1 as the source MAC address and MAC 2 as the destination MAC address, $IP_{MH@ON}$ as the source IP address of the MH 800 and $IP_{DST@INT}$ as the destination IP address of the target host 809. At 832 the intelligent device 802 sends the IP packet over the WLAN interface to the WLAN 806 using $MAC_{WLAN}$ as the source MAC address and $MAC_{AP}$ as the destination MAC address of the AP on the WLAN 806. The office WLAN 806 then forwards the packet at 834 to the host 809 using $MAC_{WLAN}$ as the source MAC address and $MAC_{DST}$ as the destination MAC address.

Figure 9:
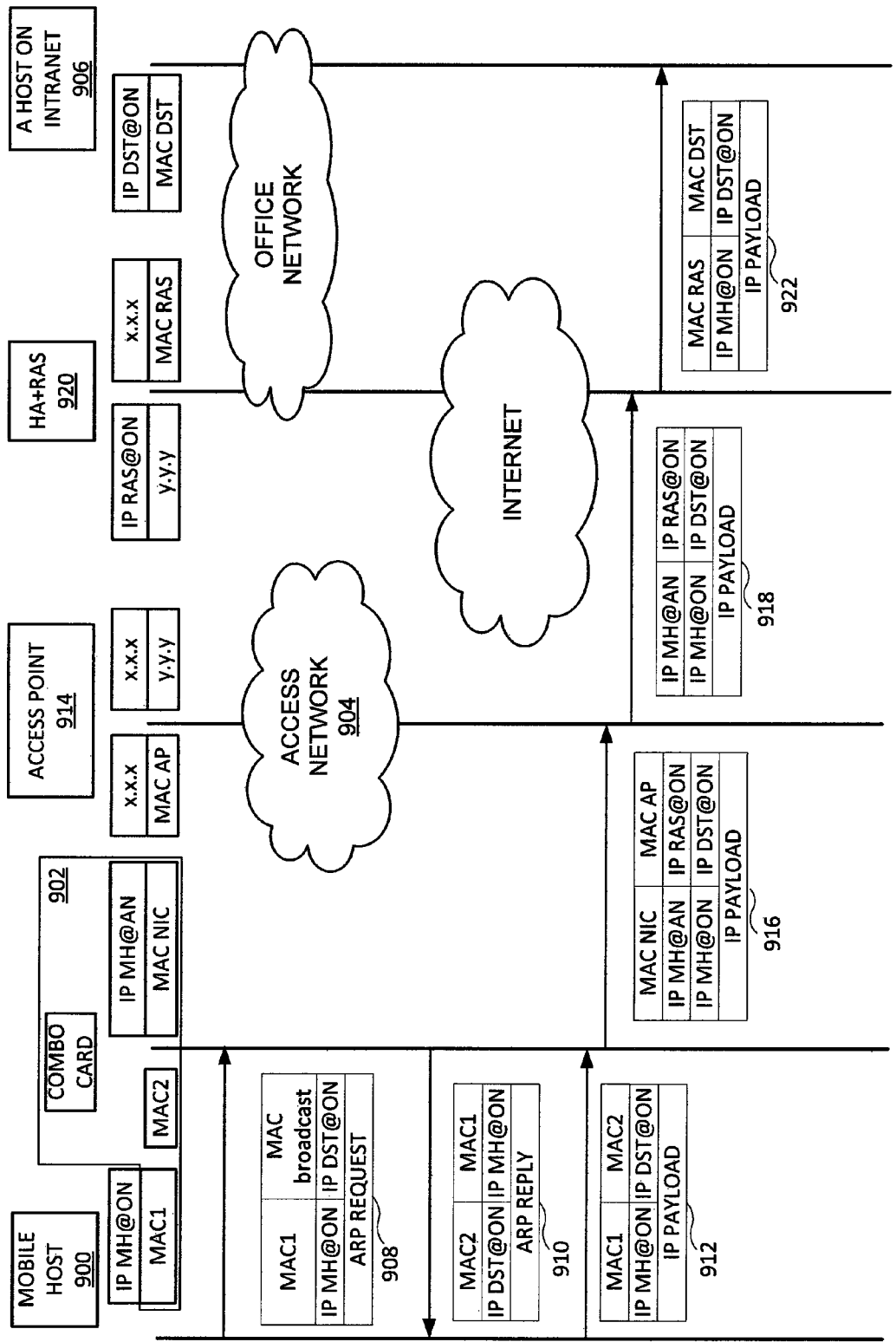
FIG. 9 is a flow diagram of routing signaling (ARP protocol) between a mobile host, intelligent device, home agent, and a destination host on the office network as shown in FIG. 4.

Referring now to FIG. 9, there is shown a flow diagram of ARP protocol signaling in a case where the mobile host sends an ARP query message to obtain the MAC address of another host to the office network, to which the mobile host is remotely connected, so that the mobile host can send an IP packet to the destination host directly. Here, the MH 900 has an IP address $IP_{MH@ON}$ and desires to send a Datagram to a host on the Office Intranet 906 with IP address $IP_{DST@ON}$. The MH 900 is assumed to be within the coverage of a foreign WLAN. At 908, the MH 900 sends an ARP request to the intelligent device 902 with a source MAC address MAC 1 and the destination MAC address $MAC_{broadcast}$. The message is packaged into an Ethernet frame as described above. If no reply message is received within a specified period of time, the MH 900 assumes the link has been broken. After the intelligent device 902 receives this message, it sends a fake ARP reply message at 910 to the MH 900 with $IP_{DST@ON}$ corresponding to MAC 2 as the source IP address. At 912, the MH 900 then packages an IP packet into an Ethernet frame with MAC 1 as the source MAC address and MAC 2 as the destination MAC address, and $IP_{MH@ON}$ as the source IP address and $IP_{DST-ON}$ as the destination IP address. The intelligent device 902 then uses a Mobile IP routing mechanism to forward the packet to the intended destination. The intelligent device 902 extracts the IP packet from the Ethernet frame, and encapsulates this packet at 916 into IP-in-IP packet in a WLAN frame with $MAC_{Ntc}$ (the MAC associated with the WLAN interface card) as the source MAC address and $MAC_{AP}$ (the MAC of the access point 914) as the destination MAC address. The IP-in-IP packet in the WLAN frame has the form [$MAC_{NIC}$, $MAC_{AP}$ [$IP_{MH@AN}$, $IP_{RAS@ON}$ [$IP_{MH@ON}$, $IP_{DST@ON}$, IP PAYLOAD]]]. The AP 914 strips off the MAC address and forwards the IP-in-IP packet in the form [$IP_{MH@AN}$, $IP_{RAS@ON}$ [$IP_{MH@AN}$, $IP_{DST@ON}$, IP PAYLOAD]] over the Internet to the HA+RAS 920. The HA+RAS then removes $IP_{MH@AN}$ and $IP_{RAS@ON}$ and at 922 forwards the packet in the form [$MAC_{RAS}$, $MAC_{DST}$ [$IP_{MH@ON}$, $IP_{DST@ON}$, IP PAYLOAD]] to the target host 906.

The present invention has been shown in what are considered to be the most preferred and practical embodiments. It is anticipated, however, that departures may be made therefrom and that obvious modifications will be implemented by persons skilled in the art.

What is claimed is:

1. A device coupled to a mobile host for connecting the mobile host to an access network, the device comprising:
   a processor; and
   a memory storing executable program instructions which, when executed by the processor, enable the processor to perform operations, the operations comprising:
      receiving a request message from the mobile host using a host configuration protocol;
      sending an access request to the access network;
      receiving a response to the access request from the access network with a first internet protocol address for the mobile host;
      selecting a second internet protocol address in a same subnet as the first internet protocol address for the mobile host; and
      sending a reply message to the mobile host with the second internet protocol address as a source internet protocol address and the first internet protocol address as a destination internet protocol address.

2. The device of claim 1, wherein the access network comprises a cellular network.

3. The device of claim 1, wherein the request message is provided in an internet protocol packet.

4. The device of claim 3, wherein the internet protocol packet is packaged into a first ethernet frame.

5. The device of claim 4, wherein the Internet protocol packet is packaged into the first ethernet frame with a first media access control address.

6. The device of claim 5, wherein the first media access control address is owned by the device.

7. The device of claim 6, wherein the reply message is packaged into a second ethernet frame.

8. The device of claim 7, wherein the reply message is packaged into the second ethernet frame with a second media access control address.

9. The device of claim 8, wherein the second media access control address emulates a media access control address of a first hop router.

10. The device of claim 9, wherein the second ethernet frame is sent to the mobile host with the first media access control address being a source media access control address and the second media access control address being a destination media access control address.

11. The device of claim 1, wherein the access network comprises a wireless local area network.

12. The device of claim 11, wherein the internet protocol packet is packaged into a first ethernet frame.

13. The device of claim 12, wherein the internet protocol packet is packaged into the first ethernet frame with a first media access control address.

14. The device of claim 13, wherein the first media access control address is owned by the device.

15. The device of claim 14, wherein the reply message is packaged into a second ethernet frame.

16. The device of claim 15, wherein the reply message is packaged into the second ethernet frame with a second media access control address.

17. The device of claim 16, wherein the second media access control address emulates a media access control address of a first hop router.

18. The device of claim 17, wherein the second ethernet frame is sent to the mobile host with the first media access control address being a source media access control address and the second media access control address being a destination media access control address.

19. A memory storing a plurality of instructions which, when executed by a processor, cause the processor to perform operations for connecting a mobile host to an access network, the operations comprising:

receiving a request message from the mobile host using a host configuration protocol;

sending an access request to the access network;

receiving a response to the access request from the access network with a first internet protocol address for the mobile host;

selecting a second internet protocol address in a same subnet as the first internet protocol address for the mobile host; and sending a reply message to the mobile host with the second internet protocol address as a source internet protocol address and the first internet protocol address as a destination internet protocol address.

20. A method for connecting a mobile host to an access network, comprising:

receiving, by a processor, a request message from the mobile host using a host configuration protocol;

sending, by the processor, an access request to the access network;

receiving, by the processor, a response to the access request from the access network with a first internet protocol address for the mobile host;

selecting, by the processor, a second Internet protocol address in a same subnet as the first internet protocol address for the mobile host; and sending, by the processor, a reply message to the mobile host with the second internet protocol address as a source internet protocol address and the first internet protocol address as a destination internet protocol address.

* * * * *